US008496825B1

(12) United States Patent
Jons et al.

(10) Patent No.: US 8,496,825 B1
(45) Date of Patent: Jul. 30, 2013

(54) SPIRAL WOUND MODULE INCLUDING MEMBRANE SHEET WITH REGIONS HAVING DIFFERENT PERMEABILITIES

(75) Inventors: Steven D. Jons, Eden Prairie, MN (US); Allyn R. Marsh, III, Lakeville, MN (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/808,281

(22) PCT Filed: Oct. 17, 2011

(86) PCT No.: PCT/US2011/056499
§ 371 (c)(1),
(2), (4) Date: Jan. 4, 2013

(87) PCT Pub. No.: WO2012/058038
PCT Pub. Date: May 3, 2012

Related U.S. Application Data

(60) Provisional application No. 61/406,597, filed on Oct. 26, 2010.

(51) Int. Cl.
*B01D 63/00* (2006.01)
*B01D 63/10* (2006.01)
*B01D 35/28* (2006.01)
*B01D 71/00* (2006.01)
*B01D 69/00* (2006.01)
*C02F 1/44* (2006.01)

(52) U.S. Cl.
USPC ............. 210/321.83; 210/321.74; 210/321.6; 210/435; 210/437; 210/446; 210/500.21

(58) Field of Classification Search
None
See application file for complete search history.

(56) References Cited

U.S. PATENT DOCUMENTS

| | | | |
|---|---|---|---|
| 4,016,083 A | 4/1977 | Sakaguchi et al. |
| 4,214,994 A | 7/1980 | Kitano et al. |
| 4,277,338 A | 7/1981 | Hoagland |
| 4,277,344 A | 7/1981 | Cadotte |
| 4,299,702 A | 11/1981 | Bairinji et al. |
| 4,358,377 A | 11/1982 | Clark |
| 4,411,783 A | 10/1983 | Dickens et al. |
| 4,600,512 A | 7/1986 | Aid |
| 4,792,401 A | 12/1988 | Truex et al. |
| 4,795,559 A | 1/1989 | Shinjou et al. |
| 4,842,736 A | 6/1989 | Bray et al. |
| 5,096,584 A | 3/1992 | Reddy et al. |

(Continued)

FOREIGN PATENT DOCUMENTS

| | | |
|---|---|---|
| DE | 10356809 | 12/2005 |
| EP | 1201293 | 5/2002 |

(Continued)

OTHER PUBLICATIONS

Antrim et al. Worlds largest sprial element-histroy and development, Desalination 178 (2005) 313-324.

(Continued)

*Primary Examiner* — Benjamin Kurtz
(74) *Attorney, Agent, or Firm* — Edward W. Black

(57) ABSTRACT

The present invention is directed toward spiral wound modules including membrane sheets with regions (70,72) having different permeabilities. Said regions are arranged either axially or radially or both.

15 Claims, 7 Drawing Sheets

U.S. PATENT DOCUMENTS

| | | | |
|---|---|---|---|
| 5,114,582 | A | 5/1992 | Sandstrom et al. |
| 5,130,022 | A | 7/1992 | Chara |
| 5,147,541 | A | 9/1992 | McDermott, Jr. et al. |
| 5,167,818 | A | 12/1992 | Baert et al. |
| 5,178,753 | A | 1/1993 | Trabold |
| 5,389,260 | A | 2/1995 | Hemp et al. |
| 5,435,957 | A | 7/1995 | Degen et al. |
| 5,538,642 | A | 7/1996 | Solie |
| 5,552,047 | A | 9/1996 | Oshida et al. |
| 5,658,460 | A | 8/1997 | Cadotte et al. |
| 5,681,467 | A | 10/1997 | Solie et al. |
| 5,919,026 | A | 7/1999 | Appleton |
| 6,066,254 | A | 5/2000 | Huschke et al. |
| 6,156,680 | A | 12/2000 | Goettmann |
| 6,224,767 | B1 | 5/2001 | Fujiwara et al. |
| 6,255,359 | B1 | 7/2001 | Agrawal et al. |
| 6,277,282 | B1 | 8/2001 | Kihara et al. |
| 6,280,853 | B1 | 8/2001 | Mickols |
| 6,286,838 | B1 | 9/2001 | Kruger et al. |
| 6,299,772 | B1 | 10/2001 | Huschke et al. |
| 6,499,606 | B1 * | 12/2002 | Grangeon et al. ............ 210/490 |
| 6,543,625 | B1 | 4/2003 | Le Roux et al. |
| 6,592,758 | B2 | 7/2003 | Quintel |
| 6,632,356 | B2 | 10/2003 | Hallan et al. |
| 6,758,970 | B1 | 7/2004 | Nurminen et al. |
| 6,878,278 | B2 | 4/2005 | Mickols |
| 6,881,336 | B2 | 4/2005 | Johnson |
| 6,966,904 | B2 | 11/2005 | Ruth et al. |
| 7,048,855 | B2 | 5/2006 | De La Cruz |
| 7,208,088 | B2 | 4/2007 | Almasian et al. |
| 7,815,987 | B2 | 10/2010 | Mickols et al. |
| 7,875,177 | B2 | 1/2011 | Haynes et al. |
| 8,110,016 | B2 | 2/2012 | McCollam |
| 8,142,588 | B2 | 3/2012 | McCollam |
| 2003/0057148 | A1 | 3/2003 | Zuk, Jr. |
| 2003/0205520 | A1 * | 11/2003 | Johnson .................. 210/321.85 |
| 2003/0217534 | A1 | 11/2003 | Krisko et al. |
| 2004/0194441 | A1 | 10/2004 | Kirsch |
| 2005/0103703 | A1 | 5/2005 | Young et al. |
| 2005/0121380 | A1 | 6/2005 | De La Cruz |
| 2005/0173319 | A1 | 8/2005 | Fritze et al. |
| 2006/0091064 | A1 | 5/2006 | Brown et al. |
| 2007/0029237 | A1 | 2/2007 | Crawford et al. |
| 2007/0251883 | A1 | 11/2007 | Niu |
| 2007/0272628 | A1 | 11/2007 | Mickols et al. |
| 2007/0284300 | A1 | 12/2007 | Bidlingmeyer et al. |
| 2008/0136117 | A1 | 6/2008 | Roe et al. |
| 2008/0185332 | A1 | 8/2008 | Niu et al. |
| 2008/0295951 | A1 | 12/2008 | Hiro et al. |
| 2009/0159527 | A1 | 6/2009 | Mickols et al. |
| 2010/0006504 | A1 | 1/2010 | Odaka et al. |
| 2010/0140161 | A1 | 6/2010 | Haynes et al. |
| 2010/0143733 | A1 | 6/2010 | Mickols et al. |
| 2010/0147761 | A1 | 6/2010 | McCollam |
| 2010/0193428 | A1 | 8/2010 | Hane et al. |
| 2010/0224161 | A1 | 9/2010 | Kolczyk et al. |
| 2011/0042294 | A1 | 2/2011 | Bonta et al. |
| 2012/0097597 | A1 | 4/2012 | Billovits et al. |

FOREIGN PATENT DOCUMENTS

| | | |
|---|---|---|
| EP | 1457243 | 9/2004 |
| EP | 1637214 | 3/2006 |
| JP | 4201433 | 6/1999 |
| JP | 2009131840 | 6/2009 |
| JP | 2009195871 | 9/2009 |
| JP | 2009220070 | 10/2009 |
| WO | 9718882 | 5/1997 |
| WO | 2007067751 | 5/2007 |

OTHER PUBLICATIONS

Chirrick et al. Development of Large Spiral Membrane Reverse osmosis Elements for Low-cost water Purification and reclamation, Research and Development Report No. 901, Nov. 1973.

Chai, et al;., Ultrasound, gravimetric, and SEM Studies of inorganic fouling in spiral-wound membrane modules, Desalination, Elsevier, Amsterdam, NL, vol. 208, No. 1-3, Mar. 31, 2007, pp. 277-293.

* cited by examiner

SPIRAL WOUND MODULE INCLUDING MEMBRANE SHEET WITH REGIONS HAVING DIFFERENT PERMEABILITIES

FIELD OF THE INVENTION

The present invention is directed toward spiral wound modules and methods for making and using the same.

DESCRIPTION OF THE RELATED ART

Spiral wound modules (also referred to as spiral wound "elements") are well known for use in a variety of fluid separations including hyperfiltration. "Hyperfiltration" is a membrane-based separation process where pressure is applied to a feed solution on one side of a semi-permeable membrane. The applied pressure causes "solvent" (e.g. water) to pass through the membrane (i.e. forming a permeate solution) while "solutes" (e.g. salts) are rejected and remain in the feed solution. To overcome the natural driving force of solvent to move from low to high concentration, the applied feed pressure must exceed the osmotic pressure. For this reason, the term "hyperfiltration" is often used interchangeable with "reverse osmosis." For purposes of this description, the term "hyperfiltration" encompasses both reverse osmosis (RO) and nanofiltration (NF). And it is further recognized that modules containing hyperfiltration membranes may also be used in forward or direct osmosis processes.

The solvent flux ($J_s$) of a hyperfiltration membrane is proportional to the pressure differential across the membrane minus the difference in osmotic pressure between the feed and permeate solutions. See Mulder, Basic Principles of Membrane Technology, $2^{nd}$ Ed. (Kluwer Academic Publishers (1996). For aqueous feeds, water flux ($J_w$) can be defined as:

$$J_w = A(\Delta p - \Delta \pi) \quad \text{(Formula I)}$$

wherein:
"A" is the water permeability coefficient or "water permeability" of the membrane;
"$\Delta p$" is the difference in applied pressure across the membrane (i.e. difference in pressure of feed solution and permeate); and
"$\Delta \pi$" the difference in osmotic pressure between the feed solution and permeate at the membrane surfaces.

During operation feed solution flows through a spiral wound module with a portion of solvent (e.g. water) passing through a semi-permeable membrane. As a result, the feed solution becomes increasingly concentrated in solute (e.g. salts) as feed flows from the inlet to outlet end of the module. Also, the applied feed pressure drops as the feed flows through the module. These combined effects result in flux imbalances across the module between the inlet and outlet ends. Similarly, a flux imbalance can also result between the permeate collection tube and the distal end of a membrane leaf (i.e. in a direction perpendicular to the permeate collection tube). In this case, pressure drop across the permeate spacer results in a higher net-driving-pressure near the center of the module as compared with its outer periphery. These flux imbalances contribute to polarization and fouling.

Various techniques for reducing flux imbalances have been proposed. For example, US 2007/0272628 describes the combination of modules having different flux characteristics within a common vessel. Other techniques include the use of shorter membrane leaf lengths to reduce pressure drop along a permeate spacer. Permeate spacers may also be chosen that vary in permeability in the direction from the permeate collection tube to a distal end (e.g. U.S. Pat. No. 4,792,401 and JP 2009/220070). While each of these approaches reduce flux imbalances, new approaches are desired.

BRIEF SUMMARY OF THE INVENTION

The present invention is directed toward a spiral wound module including a membrane sheet with regions having distinct permeabilities. In one embodiment the module includes a permeate collection tube and at least one membrane envelope wound about collection tube and defining a first and second scroll face. The membrane envelope comprises a section of membrane sheet having a length corresponding to the distance between the first and second scroll faces, a width extending in a direction perpendicular to the length, at least one longitudinal axis extending along the length of the sheet and dividing the sheet into an inner and outer region with the inner region located adjacent to the permeate collection tube, and at least one latitudinal axis extending along the width of the sheet and dividing the sheet into an inlet and outlet region with the inlet region located adjacent to the first scroll face. The membrane sheet is characterized by having an average water or average solute permeability that varies by at least 10% between at least one of: i) the inner and outer regions and ii) the inlet and outlet regions. Many additional embodiments are described including methods for making and using such modules.

BRIEF DESCRIPTION OF THE DRAWINGS

The included Figures illustrate several embodiments of the invention. The Figures are not to scale and include idealized views to facilitate description. Where possible, like numerals have been used throughout the Figures and written description to designate the same or similar features.

DETAILED DESCRIPTION OF THE INVENTION

The invention encompasses spiral wound filtration modules along with methods for making and using the same. The configuration of the spiral wound module is not particularly limited. Representative examples of spiral wound filtration modules, corresponding fabrication techniques and modes of operation are described in: U.S. Pat. No. 5,096,584, U.S. Pat. No. 5,114,582, U.S. Pat. No. 5,147,541, U.S. Pat. No. 5,538,642, U.S. Pat. No. 5,681,467, U.S. Pat. No. 6,277,282, U.S. Pat. No. 6,881,336, US 2007/0272628, US 2008/0295951 and U.S. 61/224,092. The module includes at least one membrane envelope concentrically wound about a permeate collection tube. The membrane envelope is preferably formed from one or more membrane sheets which are sealed about a portion of their periphery. An edge of the membrane envelope is axially aligned along a permeate collection tube such that the membrane envelope is in fluid communication with the permeate collection tube but is otherwise sealed from feed fluid passing across the outer surface of the membrane envelope.

Figure 1:
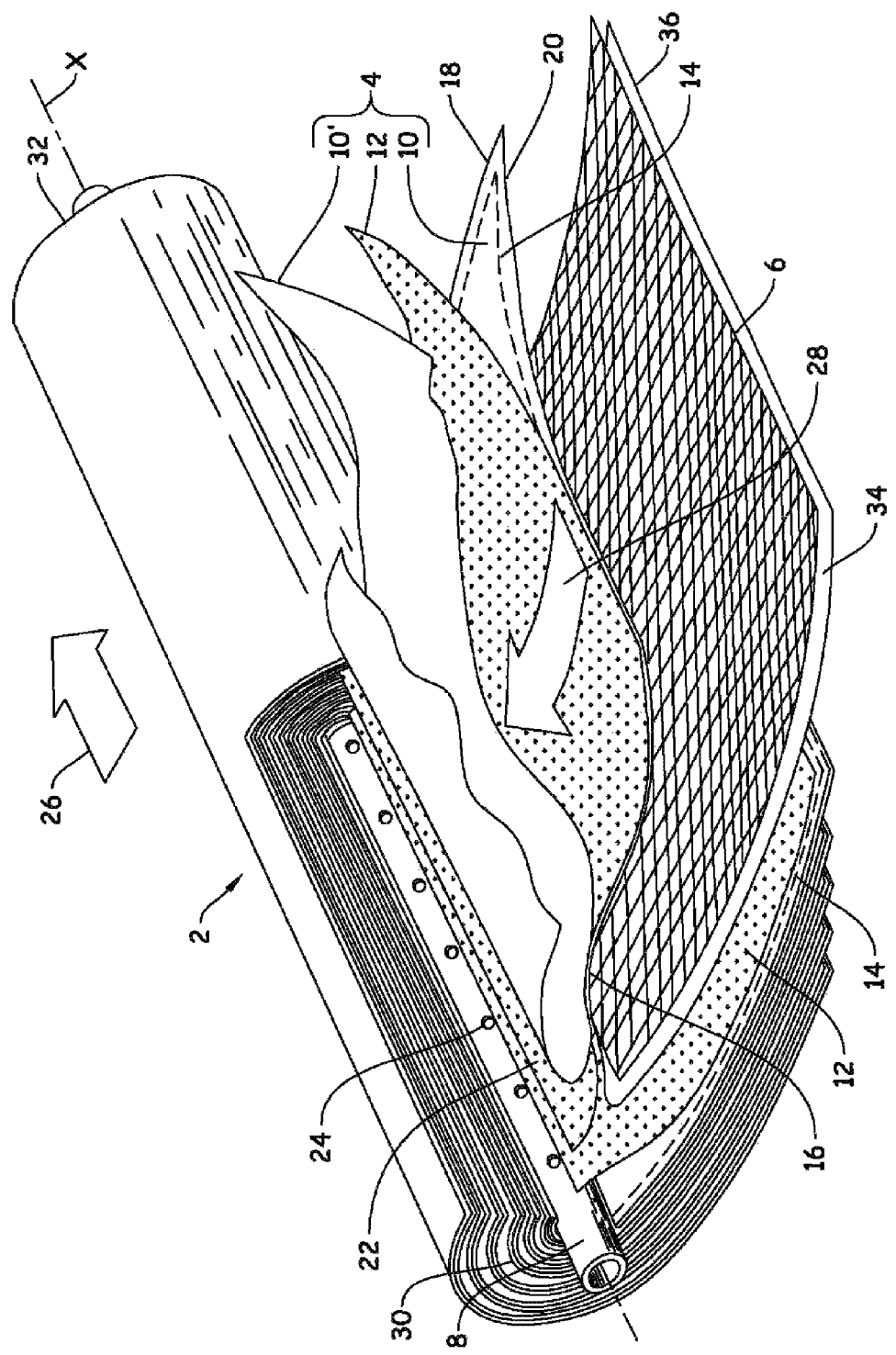
FIG. 1 is a perspective, partially cut-away view of a spiral wound filtration module.

A preferred embodiment of a spiral wound filtration module is generally shown at 2 in FIG. 1. The module (2) is formed by concentrically winding one or more membrane envelopes (4) and optional feed channel spacer sheet(s) ("feed spacers") (6) about a permeate collection tube (8). Each membrane envelope (4) preferably comprises two substantially rectangular sections of membrane sheet (10, 10'). Each section of membrane sheet (10, 10') has a semi-permeable membrane layer or front side (34) and support layer or back side (36). The membrane envelope (4) is formed by overlaying membrane sheets (10, 10') and aligning their edges. In a preferred embodiment, the sections (10, 10') of membrane sheet surround a permeate channel spacer sheet ("permeate spacer") (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8).

The module (2) preferably comprises a plurality of membrane envelopes (4) separated by a plurality of feed spacers sheets (6). In the illustrated embodiment, membrane envelopes (4) are formed by joining the back side (36) surfaces of adjacently positioned "membrane leaf packets." Examples of representative membrane leaf packets and methods for their fabrication are further described in: U.S. Pat. No. 4,842,736; U.S. Pat. No. 5,147,541 and US 2010/0140161. In one preferred embodiment (as will be described in more detail with reference to FIGS. 5A-5B), a membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). While not shown, additional intermediate layers may also be included in the assembly. During module fabrication, permeate spacer sheets (12) may be attached about the circumference of the permeate collection tube (8) with membrane leaf packets interleaved therebetween. The back sides (36) of adjacently positioned membrane leaves (10, 10') are sealed about portions of their periphery (16, 18, 20) to enclose the permeate spacer sheet (12) to form a membrane envelope (4). The membrane envelope(s) (4) and feed spacer(s) (6) are wound or "rolled" concentrically about the permeate collection tube (8) to form a first and second scroll face (30, 32) at opposing ends and the resulting spiral bundle is held in place, such as by tape or other means. The sealant (14) used for sealing the edges (16, 18, 20) of the membrane envelope (4) preferably permits relative movement of the various sheet materials during the winding process. That is, the cure rate or period of time before which the sealant (14) becomes tacky is preferably longer than that required to assemble and wind the membrane envelopes (4) about the permeate collection tube (8).

Arrows shown in FIG. 1 represent the approximate flow directions (26, 28) of feed and permeate fluid during operation. Feed fluid enters the module (2) from an inlet scroll face (30) and flows across the front side(s) (34) of the membrane sheet(s) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Additional permeate spacers are described in US 2010/0006504. Representative feed spacers include polyethylene, polyester, and polypropylene mesh materials such as those commercially available under the trade name VEXAR™ from Conwed Plastics. Additional feed spacers are described in U.S. Pat. No. 6,881,336.

During module fabrication, long glass fibers may be wound about the partially constructed module and resin (e.g. liquid epoxy) applied and hardened. In an alternative embodiment, tape may be applied upon the circumference of the wound module as described in U.S. 61/255,121 to McCollam. The ends of modules are often fitted with an anti-telescoping device or end cap (not shown) designed to prevent membrane envelopes from shifting under the pressure differential between the inlet and outlet scroll ends of the module. The end cap is commonly fitted with an elastomeric seal (not shown) to form a tight fluid connection between the module and a pressure vessel (not shown). Examples of end cap designs include those available from The Dow Chemical Company, i.e. iLEC™ interlocking end caps and those described in U.S. Pat. No. 6,632,356 and U.S. Ser. No. 12/545,098 to Hallan, et al. The outer housing of a module may include fluid seals to provide a seal within the pressure vessel as described in U.S. Pat. No. 6,299,772 and U.S. Pat. No. 6,066,254 to Huschke et al. and US 2010/0147761 to McCollam. Additional details regarding various components and construction of spiral wound modules are provided in the literature see for example U.S. Pat. No. 5,538,642 to Solie which describes a technique for attaching the permeate spacer to the permeate collection tube and WO 2007/067751 to Jons et al. which describes trimming operations and the use of a UV adhesive for forming an insertion point seal.

The membrane sheet comprises at least one semi-permeable membrane layer (front side) and a support layer (back side) in planer arrangement with each other to form a composite structure. The support layer is not particularly limited but preferably comprises a non-woven fabric or fibrous web mat including fibers which may be orientated. Alternatively, a woven fabric such as sail cloth may be used. Representative examples of support layers are described in U.S. Pat. No. 4,214,994, U.S. Pat. No. 4,795,559, U.S. Pat. No. 5,435,957, U.S. Pat. No. 5,919,026, U.S. Pat. No. 6,156,680, U.S. Pat. No. 7,048,855, US 2008/0295951 and US 2010/0193428. In preferred embodiments, the support layer is provided as a roll of sheet material upon which a membrane layer is applied. The support layer preferably comprises non-woven fibers orientated in the roll direction such that the support layer has an elastic modulus in the roll direction (i.e. length direction) which is at least 1.5 times greater and more preferably at least 3 times greater than the elastic modulus in a direction perpendicular to the roll direction (i.e. width direction). Similarly, the membrane sheet formed with the support layer also preferably has a elastic modulus in the roll direction (i.e. length direction) which is at least 1.5 times greater and more preferably at least 3 times greater than the elastic modulus in a direction perpendicular to the roll direction (i.e. width direction). As used herein, the term "elastic modulus" refers to Young's modulus or tensile elasticity, i.e. the ratio of tensile stress to tensile strain, as measured by ASTM (D882-09). A support layer including fibers orientated in the roll direction provides a module with improved dimensional strength along the modules' length. This added strength can be particularly useful when making long modules, i.e. modules over 1 meter long. It will be understood by those skilled in the art that fibers of support layers extend along a variety of directions and that term "orientated" is intended to refer to a relative value, i.e. a dominate alignment direction of fibers, rather than an absolute value.

The support layer preferably includes a microporous polymer support that may be cast upon the aforementioned non-woven fabric or fibrous web mat. The microporous support is preferably about 25-125 microns in thickness. The microporous support preferable comprises a polymeric material having pore sizes which are of sufficient size to permit essentially unrestricted passage of permeate but not large enough so as to interfere with the bridging over of a semi-permeable membrane layer formed thereon. For example, the pore size of the support preferably ranges from about 0.001 to 0.5 micron. In some instances pore diameters larger than about 0.5 micron permit the semi-permeable membrane layer to sag into the pores and disrupt a flat sheet configuration. Examples of microporous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The microporous support may also be made of other materials. The microporous support provides strength but offers little resistance to fluid flow due to its relatively high porosity.

In a preferred embodiment, the semi-permeable membrane layer of the membrane sheet comprises a hyperfiltration membrane, i.e. a semi-permeable membrane suitable for hyperfiltration processes. Such membranes and processes are often referred to as reverse osmosis (RO) and nanofiltration (NF). For purposes of this description, the term "hyperfiltration" encompasses both RO and NF processes. RO membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 Daltons. NF membranes are more permeable than RO composite membranes and typically reject less than about 95% of salts having monovalent ions while rejecting more than about 50% (and often more than 90%) of salts having divalent ions—depending upon the species of divalent ions. NF membrane also typically reject particles in the nanometer range as well as organic molecules having molecular weights greater than approximately 200 to 500 Daltons.

In a preferred embodiment, the hyperfiltration membrane layer comprises a thin film polyamide layer having a thickness of less than about 1 micron and more preferably from about 0.010 to 0.1 micron. Due to its relative thinness, the polyamide layer is commonly described in terms of its coating coverage or loading upon the microporous support, e.g. from about 2 to 5000 mg of polyamide per square meter surface area of microporous support and more preferably from about 50 to 500 mg/m$^2$. The polyamide layer is preferably formed by an interfacial polycondensation reaction between a polyfunctional amine monomer and a polyfunctional acyl halide monomer upon the surface of the microporous polymer support, as generally described in U.S. Pat. No. 4,277,344 and U.S. Pat. No. 5,658,460 to Cadotte et al. and U.S. Pat. No. 6,878,278 to Mickols. More specifically, the polyamide membrane layer may be prepared by interfacially polymerizing a polyfunctional amine monomer with a polyfunctional acyl halide, (wherein each term is intended to refer both to the use of a single species or multiple species), on at least one surface of a microporous support. As used herein, the term "polyamide" refers to a polymer in which amide linkages (—C(O)NH—) occur along the molecular chain. The polyfunctional amine monomer and polyfunctional acyl halide are most commonly delivered to the microporous support by way of a coating step from solution, where the polyfunctional amine monomer is typically coated from an aqueous-based solution and the polyfunctional acyl halide from an organic-based solution. Although the coating steps need not follow a specific order, the polyfunctional amine monomer is preferably coated on the microporous support first followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer may have primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, and tris (2-diaminoethyl) amine). Examples of preferred polyfunctional amine monomers include primary amines having two or three amino groups, for example, m-phenylene diamine, and secondary aliphatic amines having two amino groups such as piperazine. The polyfunctional amine monomer may be applied to the microporous support as an aqueous-based solution. The aqueous solution may contain from about 0.1 to about 20 weight percent and more preferably from about 0.5 to about 6 weight percent polyfunctional amine monomer. Once coated on the microporous support, excess aqueous solution may be optionally removed.

The polyfunctional acyl halide is preferably coated from an organic-based solution including a non-polar solvent. Alternatively, the polyfunctional acyl halide may be delivered from a vapor phase (e.g., for polyfunctional acyl halide species having sufficient vapor pressure). The polyfunctional acyl halide is preferably aromatic and contains at least two and preferably three acyl halide groups per molecule. Because of their lower cost and greater availability, chlorides are generally preferred over other halides such as bromides or iodides. One preferred polyfunctional acyl halide is trimesoyl chloride (TMC). The polyfunctional acyl halide may be dissolved in a non-polar solvent in a range from about 0.01 to 10 weight percent, preferably 0.05 to 3 weight percent, and may be delivered as part of a continuous coating operation. Suitable solvents are those which are capable of dissolving the polyfunctional acyl halide and which are immiscible with water, e.g. hexane, cyclohexane, heptane and halogenated hydrocarbons such as the FREON series. Preferred solvents include those which pose little threat to the ozone layer and which are sufficiently safe in terms of flashpoints and flammability to undergo routine processing without taking special precautions. A preferred non-polar solvent is ISOPAR™ available from Exxon Chemical Company. The organic-based solution may also include small quantities of other materials.

Once brought into contact with one another, the polyfunctional acyl halide and the polyfunctional amine monomer react at their surface interface to form a polyamide layer or film. This layer, often referred to as a polyamide "discriminating layer" or "thin film layer," provides the composite membrane with its principal means for separating solute (e.g. salts) from solvent (e.g. water). The reaction time of the polyfunctional acyl halide and the polyfunctional amine monomer may be less than one second but contact times typically range from about 1 to 60 seconds, after which excess liquid may be optionally removed by way of an air knife, water bath(s), dryer or the like. The removal of the excess water or organic solvent can be achieved by drying at elevated temperatures, e.g. from about 40° C. to about 120° C., although air drying at ambient temperatures may be used.

The polyamide layer may include one or more coatings including those described in U.S. Pat. No. 6,280,853, U.S. Pat. No. 6,878,278, US 2009/0159527 and US 2010/0143733 to Mickols and US 2007/0251883 and US 2008/0185332 to Niu et al.

In a preferred embodiment, the membrane sheet has regions with distinct water permeabilities, e.g. the water permeability varies across portions of the length or width (or both) of the membrane sheet. For purposes of this description, the term "water permeability" ("A") is defined as:

$$A = J_w/(\Delta p - \Delta \pi)$$ (Formula II)

wherein:
"$J_w$" Is The Water Flux Of the membrane,
"$\Delta p$" is the difference in applied pressure across the membrane (i.e. difference in pressure of feed solution and permeate), and
"$\Delta \pi$" the difference in osmotic pressure between the feed solution and permeate at the membrane surfaces.

The value of "A" (A-value) is a constant of the membrane that depends principally on temperature and to a much lesser extent, other operating conditions. For purposes of the present description, the A-value for a membrane region may be measured by dividing the water flux by the differential pressure, where flux is measured at 25° C., using pure water at a pH of 7 with a differential pressure sufficient to result in a flux of approximately 1 L/m²/day. Accurate measurements of the A-value may require wetting out the membrane by placing it first into an alcohol solution, such as 25% isopropyl alcohol, and then equilibrating it in water before measurement.

The membrane sheet may also, or alternatively, have regions of distinct solute permeabilities, e.g. the solute permeability varies across portions of the length or width (or both) of the membrane sheet. For purposes of this description, the term "solute permeability" ("B") is defined as:

$$B = (J_w \times SP)/(1-SP)$$ (Formula III)

wherein:
"$J_w$" is the water flux of the membrane and "SP" is the fractional solute passage through the membrane.

Similar to the A-value, the value of B (B-value) of a membrane changes with temperature. B-values may also change with ionic strength and pH. One skilled in the art will recognize that polarization can cause measurements to over estimate solute passage through the membrane. An accurate B-value is best obtained in the limit of high surface mixing. For purposes of the present description, the B-value for a solute over a region of membrane may be calculated by measuring the flux and solute passage using an aqueous solution comprising of 500 ppm of the solute (e.g. NaCl) at 25° C., pH 7, with a differential pressure sufficient to result in a flux of approximately 1 L/m²/day.

The variation in average water permeability (or average solute permeability) of the membrane sheet preferably corresponds to specific regions of membrane sheet used to make membrane envelopes or leaf packets. For example, the average water permeability of a section of membrane sheet may be varied as between an inner region (adjacent to the permeate collection tube and extending the length of the section) and an outer region (distal to the permeate collection tube and extending the length of the section), between inlet and outlet regions located adjacent to the opposing scroll faces of the module, or both. In this way, flux imbalances across the membrane sheet can be reduced. The difference in average water permeabilities (or average solute permeability) between the above-mentioned regions is preferably at least 10%, 25% or even 40%. The term "average water permeability" refers to a numerical average of at least 10, (but more preferably at least 25) A-values measured at locations evenly distributed across the entire region of membrane sheet using pure water at 25° C., pH 7, and a differential pressure sufficient to result in a flux of approximately 1 L/m²/day. The term "average solute permeability" refers to a numerical average of at least 10, (but more preferably at least 25) B-values measured at locations evenly distributed across the entire region of membrane sheet using an aqueous solution comprising 500 ppm of solute (e.g. NaCl) at 25° C., pH 7 with a differential pressure sufficient to result in a flux of approximately 1 L/m²/day. In calculating average water and solute permeabilities, locations on the membrane sheet exhibiting essentially no flux are excluded from the calculation. Such locations typically correspond to glue lines. Similarly, locations without an intact barrier layer are also excluded, such as may result from scratches or other damage. In order to clarify that such locations are excluded, the phrase "active membrane area" may be used.

Methods for preparing membrane sheets having such variances in average water permeability and/or average solute permeability are not particularly limited and may involve controlling the conditions under which the semi-permeable layer is formed. For example, during formation of a thin film polyamide layer, the concentration, stoichiometric ratio or temperature of the polyamide forming reactants (e.g. polyfunctional amine monomer and polyfunctional acyl halide monomer) may be controllably varied during coating. Alternatively, the thickness or composition of an optional coating (as described in U.S. Pat. No. 6,280,853; US 2009/0159527 and US 2010/0143733 to Mickols and US 2007/0251883 and US 2008/0185332 to Niu et al.) may be varied across the width and/or length of the membrane sheet to impart the desired differences in average water permeability.

Figure 2A:
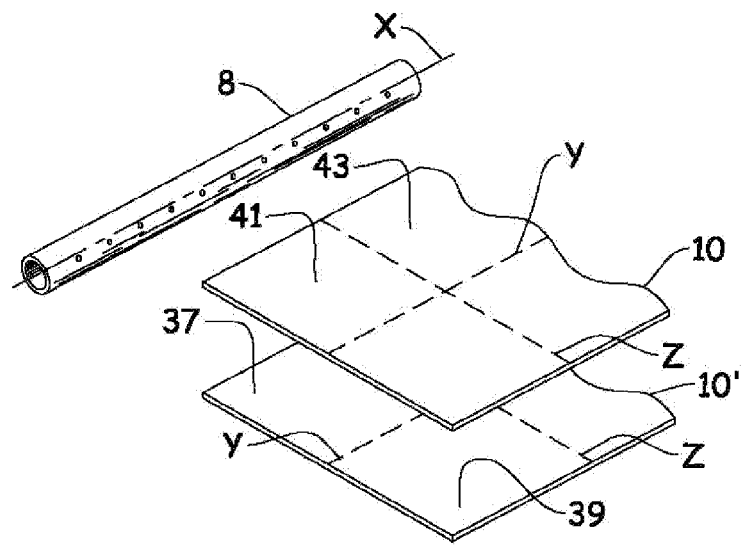
FIG. 2A is a perspective view (partially cut-away) of a partially assembled spiral wound module including two aligned sections of membrane sheet.

FIG. 2A illustrates a partially assembled spiral would module including two aligned sections (10, 10') of membrane sheet having lengths approximately corresponding to the length of a permeate collection tube (8) and a width extending in a direction perpendicular to the length. Each section (10, 10') includes at least one longitudinal axis (Y) extending along the length of the sheet and dividing the sheet into an inner (37) and outer (39) region with the inner region (37) located adjacent to the permeate collection tube (8) and the outer region (39) located distal to the tube (8). Each section (10, 10') further includes at least one latitudinal axis (Z) extending along the width of the membrane sheet and dividing the sheet into an inlet (41) and outlet (43) region with the inlet region (41) located adjacent to the first scroll face (30) and the outlet region (43) located adjacent to the second scroll face (32). While not shown in FIG. 2A, scroll faces (30, 32) are formed upon winding the membrane sections (10, 10') about the permeate collection tube (as shown in FIG. 1).

In a preferred embodiment, at least one but preferably both sections (10, 10') of membrane sheet are characterized by having an average water permeability (or average solute (e.g. NaCl) permeability) that varies by at least 10% between at least one of: i) the inner (37) and outer (39) regions and ii) the inlet (41) and outlet (43) regions. In other embodiments, the average water permeability varies by at least 25% or even 40% between such regions. In one preferred embodiment, the average water permeability of the outer region (39) of the membrane sheet is at least 10%, 25% or even 40% greater than the average water permeability of the inner region (37). In another embodiment, the average water permeability of the outlet region (43) of the membrane sheet is at least 10%, 25% or even 40% greater than the average water permeability of the inlet region (41). In yet another embodiment, both of the preceding conditions exist, i.e. both the outer and outlet regions have average water permeabilities at least 10%, 25% or event 40% greater than the average water permeability of the inner and inlet regions, respectively. In still another embodiment, the average solute (e.g. NaCl) permeability of the outlet region (43) of the membrane sheet is at least 10%, 25% or even 40% greater than the average solute permeability of the inlet region (41). Embodiments may include these features in combination. For instance, the outer region (39) may have an average water permeability that exceeds the inner region (37) by 10%, while the outlet region (43) of the membrane sheet is at least 25% or even 40% greater than the inlet region (41).

Figure 2B:
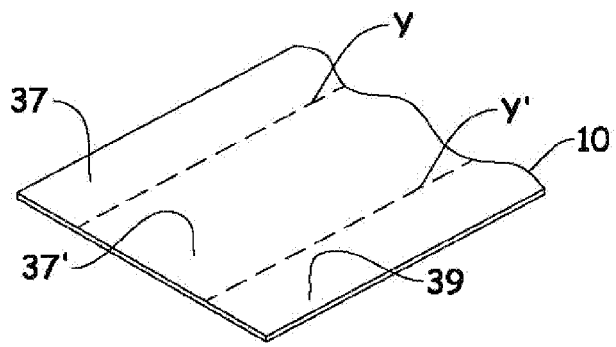
FIG. 2B is a perspective view of a section of membrane sheet.
Figure 2C:
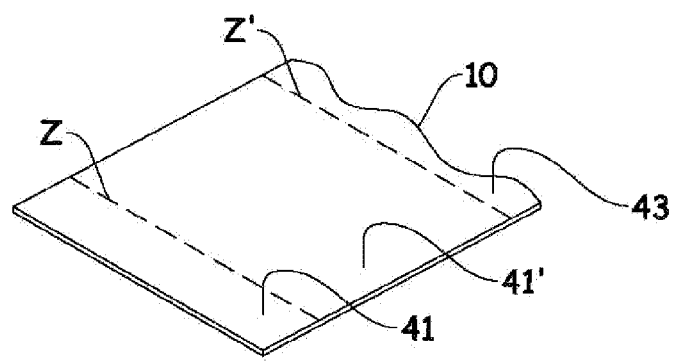
FIG. 2C is a perspective view of a section of membrane sheet.

While shown as being equal in size, the inner (37) and outer (39) regions; and inlet (41) and outlet (43) regions need not be of equivalent size. While shown as being divided into two regions (37, 39) along the length and two regions (41, 43) along the width, additional regions may be included. For example, as illustrated in FIGS. 2B and 2C, the section of membrane sheet may include multiple longitudinal (Y, Y') and latitudinal (Z, Z') axes that define a plurality of regions along the length (37, 37', 39) and width (41, 41', 43) of the sheet (10). Each longitudinal and latitudinal region is preferably at least 25 mm wide, and more preferably at least 50 mm wide. In one preferred embodiment, the membrane sheet comprises an inner and outer region that each comprise 25% of the active membrane area of the sheet closest to the permeate collection tube (8) and distal edge, respectively, (with the remaining 50% constituting a middle region). In another embodiment, the membrane sheet comprises an inlet and outlet region that each comprise 25% of the active membrane area of the sheet closest to the first and second scroll faces (with the remaining 50% constituting a center region). In yet another embodiment, both the preceding conditions are present.

Figure 3A:
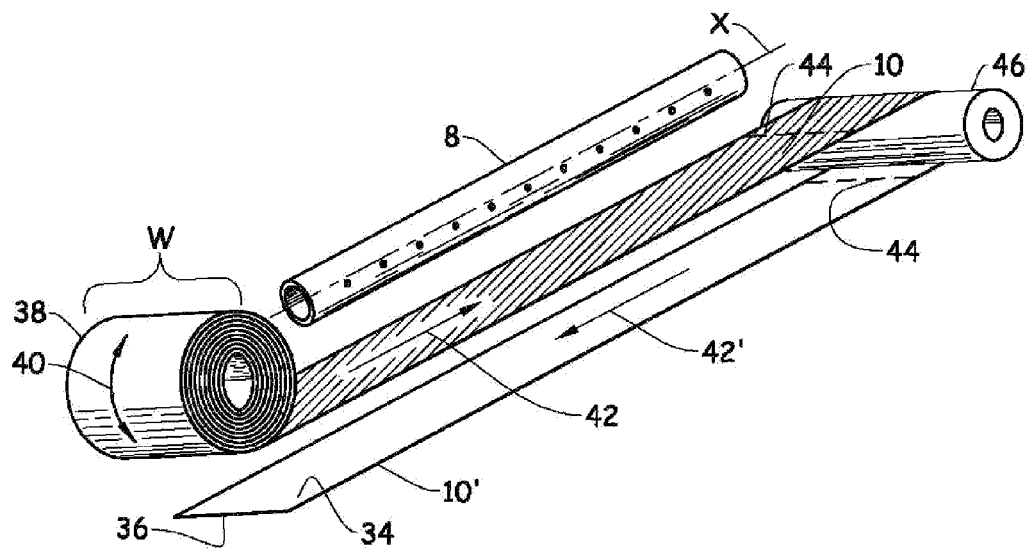
FIG. 3A is a perspective view of an idealized set-up for practicing one embodiment of the invention showing a roll of membrane sheet being unrolled along a roll direction parallel to an axis (X) of an adjacently positioned permeate collection tube.

FIG. 3A is a perspective view of an idealized set-up for practicing several embodiments of the invention. During fabrication of a spiral wound module, first and second sections (10, 10') of membrane sheet are removed from a common roll (38) having a width (W) and assembled into a membrane envelope or membrane leaf packet (not shown). The manner in which the sections (10, 10') are removed from the roll (38) is not particularly limited but preferably comprises unrolling (depicted by curved bi-direction arrow (40)) membrane sheet from the roll (38) along a roll direction (42, 42') and detaching, e.g. cutting (as depicted by dotted lines (44)) rectangular sections of membrane sheet from the roll (38). Once removed from the roll (38) the rectangular sections (10, 10') have a width corresponding to the width of the roll (38) and a length that preferably corresponds to the length of permeate collection tube (8), (e.g. the length of the sections need not be exactly the same as the tube (8) as excess sheet can be subsequently trimmed away). The length of the sections (10, 10') is preferably at least twice as large as the width, but more preferably at least 2.5, 3, 5, 7, 10 or in some embodiments at least 15 times as large. As will be subsequently described, modules made pursuant to embodiments of the present invention may have lengths over 1 meter long and in some embodiments, lengths at least 1.75 meters, 2.75 meters, 3.75 meters, 4.75 meters and even 5.75 meters long.

As will be described in connection with other Figures, a membrane envelope or membrane leaf packet can be formed by overlapping and aligning rectangular sections of membrane sheet. In the idealized set-up of FIG. 3A, sections (10, 10') of membrane sheet are provided in an overlapping orientation by unrolling the membrane sheet from a common roll (38) and reversing the roll direction by way of a roller (46). In the idealized set-up of FIG. 2A, the membrane sheet is unrolled along a roll direction (42, 42') which is parallel and adjacently aligned with an axis (X) defined by the permeate collection tube (8). While this alignment is preferred, it is not required. That is, membrane leaf packets or membrane envelopes may be prepared at a remote location and subsequently be aligned with a permeate collection tube (8) during module assembly. However, in either embodiment the roll direction (42, 42') of each section (10, 10') of membrane sheet is preferably parallel with the axis (X) defined by the permeate collection tube (8).

Figure 3B:
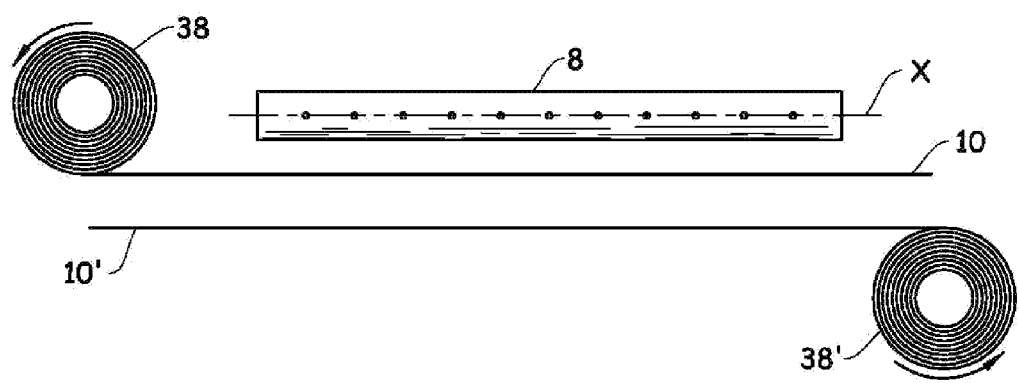
FIG. 3B is an elevational view of an idealized set-up for practicing another embodiment of the invention showing two rolls of membrane sheet being unrolled along roll directions parallel to an axis (X) of an adjacently positioned permeate collection tube.

FIG. 3B illustrates another idealized set-up for practicing an embodiment of the invention using two separate membrane rolls (38, 38'), both shown with partially unrolled sections of membrane sheet with opposing roll directions extending along a path parallel to the axis (X) of an adjacently positioned permeate collection tube (8). As with the embodiment of FIG. 3A, the illustrated set-up provides membrane sheets (10, 10') in an overlapping orientation which is adjacently aligned with the permeate collection tube (8). While shown at opposite ends of the permeate collection tube (8), the membrane rolls (38, 38') may also be positioned and unrolled from a common end.

The roll (38) upon which the membrane sheet is wound may be provided with either the membrane side (34) or support side (36) facing outward. In the embodiment of FIG. 3A, the membrane sheet is unrolled in a roll direction (42, 42') such that the support side (36) faces outward and the overlapping sections (10, 10') are orientated such that their membrane sides (34) are facing each other. As will be described in connection with FIGS. 5-6, this set-up is useful for making membrane leaf packets. Whereas, if the membrane sheet were reversed, (i.e. such that the support sides (36) of the overlapping sections (10, 10') are facing), the set-up is useful for making membrane envelopes as described in connection with FIGS. 4A-4D. Both approaches are applicable to the present invention.

As previously described, the methods for preparing membrane sheets having variances in average water permeability and/or average solute permeability are not particularly limited. In further reference to FIGS. 3A and 3B, a continuous membrane manufacturing process may be used wherein membrane chemistry and or coatings are varied in the width (W) direction during production of the membrane roll (38). For example, during formation of a semi-permeable layer, different reactants or different concentrations of reactants may be applied at to different positions on a support surface. In a reaction between m-phenylenediamine and trimesoyl chloride, applying a lower concentration of amine to the left side of the membrane than to the right will result in higher water permeability for the left side of the sheet. Similarly, additional of a small amount of a different monomer, such as m-phenylenediamine, to a piperazine and trimesoyl chloride reaction can reduce water and salt permeability across the width (W) of the membrane sheet. Likewise, directed heat or cooling may also be used to vary permeability across the membrane sheet. Reactants may also be applied or removed at different locations down the line for different positions across the membrane sheet, as reaction time can also be a relevant parameter in determining performance properties. Alternatively, the thickness or composition of an optional coating (as described in U.S. Pat. No. 6,280,853; US 2009/0159527 and US 2010/0143733 to Mickols and US 2007/0251883 and US 2008/0185332 to Niu et al.) may be varied across the membrane width to impart the desired differences in average water or solute permeability.

Another approach to obtaining a membrane sheet with regions of distinct water permeability or solute permeability is to vary properties along the roll direction (42). In a continuous membrane manufacturing process this can be done by periodically cycling conditions influential on membrane formation as the membrane sheet (10) moves in the roll direction (42). As described for variations across the membrane width, there are many parameters that may be varied in the process to induce desired variations in permeabilities. Conditions under which the semi-permeable layer is formed may be varied (time, temperature, concentrations, monomers) or the membrane properties may be modified after formation (as by coating or post-treatment). For example, in a reaction between m-phenylenediamine and trimesoyl chloride, the position at which the trimesoyl chloride is applied is one parameter that may be cycled on the time scale required. The concentration of amine applied can also be cycled at the desired rate. As will be appreciated by those skilled in the art, the rate at which conditions need to cycle depends upon line speed. The cycle rate becomes less challenging for embodiments wherein the membrane sheet is oriented with the roll direction (42) parallel to the permeate collection tube, particularly if the spiral wound module is longer than 1 meter. While spiral wound modules are typically at most one meter in length, there is an advantage in using lengths longer than 1.75 meters, 2.75 meters, 3.75 meters, 4.75 meters and even 5.75 meters. In one embodiment, membrane sheet used to make modules is provided on a continuous roll (38) and has periodic variations in average water or solute (e.g. NaCl) permeability in the roll direction (42), with a period between 2 and 20 meters.

Figure 4A:
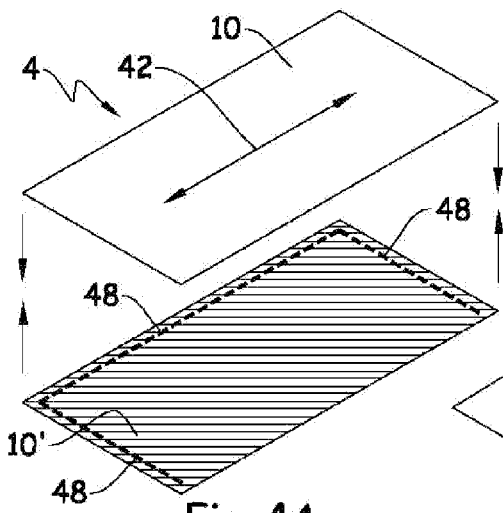
FIG. 4A is a perspective view showing one embodiment of a partially assembled membrane envelope.
Figure 4B:
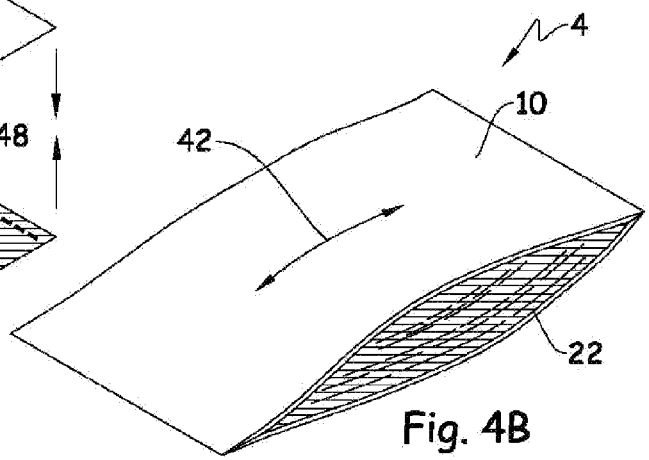
FIG. 4B is a perspective view of an assembled membrane envelope.
Figure 4C:
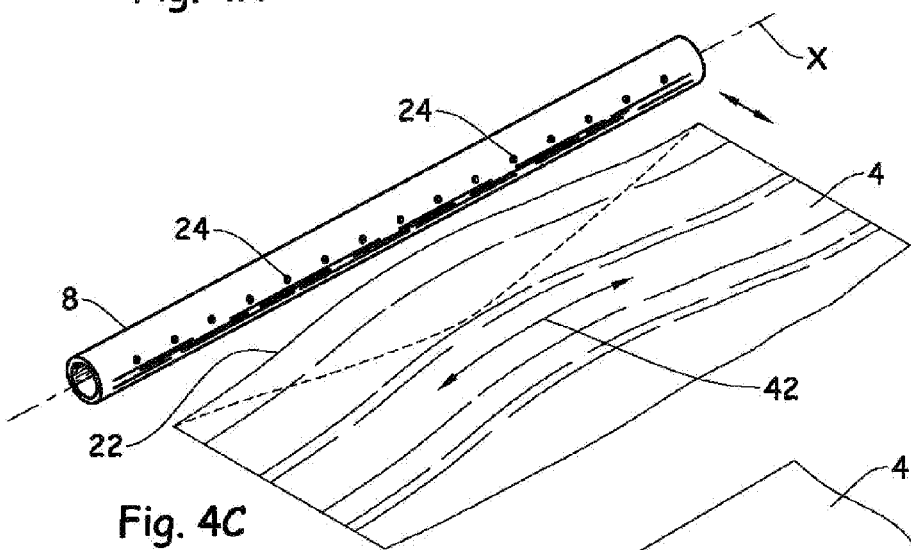
FIG. 4C is a perspective view of a partially assembled spiral wound module including the membrane envelope of FIG. 4B.
Figure 4D:
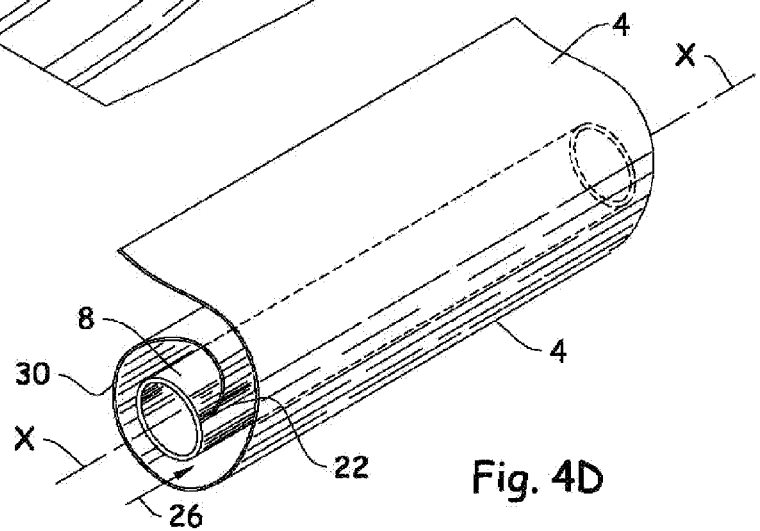
FIG. 4D is a perspective view of the partially assembled spiral wound module of FIG. 3C taken at a subsequent point of assembly.

FIGS. 4A-4D illustrate one embodiment of a membrane envelope and spiral wound module. Turning to FIG. 4A, a partially assembled membrane envelope is generally shown at 4 including a first and second rectangular section (10, 10') of membrane sheet. The membrane envelope (4) is formed by overlaying sections (10, 10') such that the roll directions (42) of both sheets (10, 10') are parallel. The overlaying sections (10, 10') are preferably arranged so that the roll direction of both sections are parallel to each other, and the inner, outer, inlet and outlet regions of each section of membrane sheet are directly opposed to each other (as best shown in FIG. 2A). The edges of the sections (10, 10') are aligned and sealed together along three edges. The method for sealing the sections together is not particularly limited, (e.g. application of adhesive or sealant (48), application of tape, localized application of heat and pressure, etc.). Once sealed together as shown in FIG. 4B, the membrane envelope (4) includes an unsealed edge or "proximate edge" (22) which is parallel to the roll directions (42) of the sections (10, 10'). FIG. 4C shows the membrane envelope (4) in alignment along the permeate collection tube (8) such that the proximal edge (22) is parallel with the axis (X) and in a proximal position along the permeate collection tube (8). Once aligned, the proximal edge (22) is in fluid communication with the opening(s) (24) along the permeate collection tube (8) but is preferably sealed such that feed fluid flowing through the module (shown as arrow 26 in FIG. 1) is prevented from passing directly into the permeate collection tube (8). FIG. 4D shows the membrane envelope (4) being concentrically wound about the permeate collection tube (8). As previously described, the membrane envelope (4) may be formed at a remote location and subsequently be aligned along a permeate collection tube (as shown in FIG. 4C) during module assembly. Alternatively, the membrane envelope may be formed from membrane sheets which are already aligned with the permeate collection tube as illustrated in FIGS. 3A-3B.

Figure 5A:
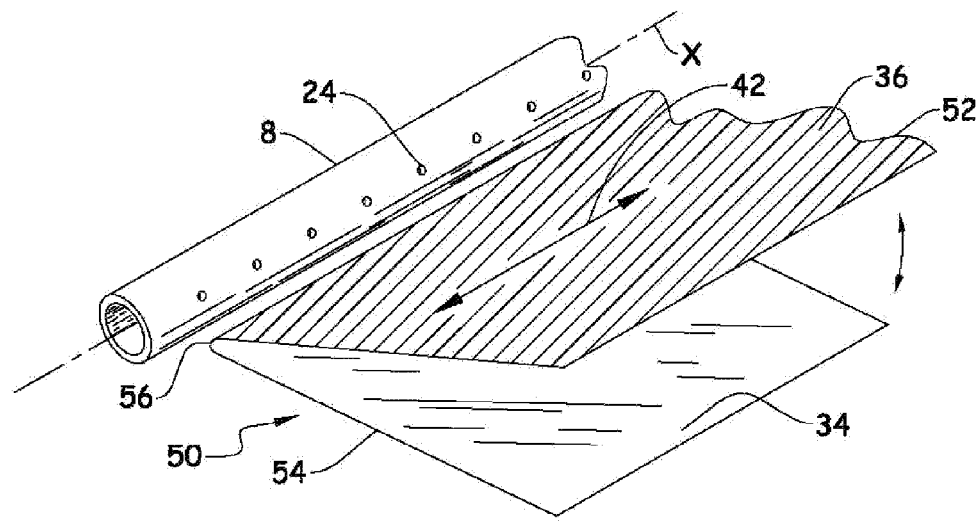
FIG. 5A is a perspective view (partially cut-away) of a partially assembled spiral wound module including one embodiment of a membrane leaf packet.

FIG. 5A illustrates an embodiment of a partially assembled membrane leaf packet, generally shown at 50. The membrane leaf packet (50) has four edges and may be prepared by removing a rectangular portion of membrane sheet from a roll (not shown). The portion is then folded along an axis parallel with the roll direction (42) of the membrane sheet to form a first (52) and second (54) leaf extending from a fold (56). The portion is folded such that the membrane sides (34) of the leaves (52, 54) face each other, preferably with their edges aligned (i.e. both leaf 52, 54 have approximately the same dimension).

Figure 5B:
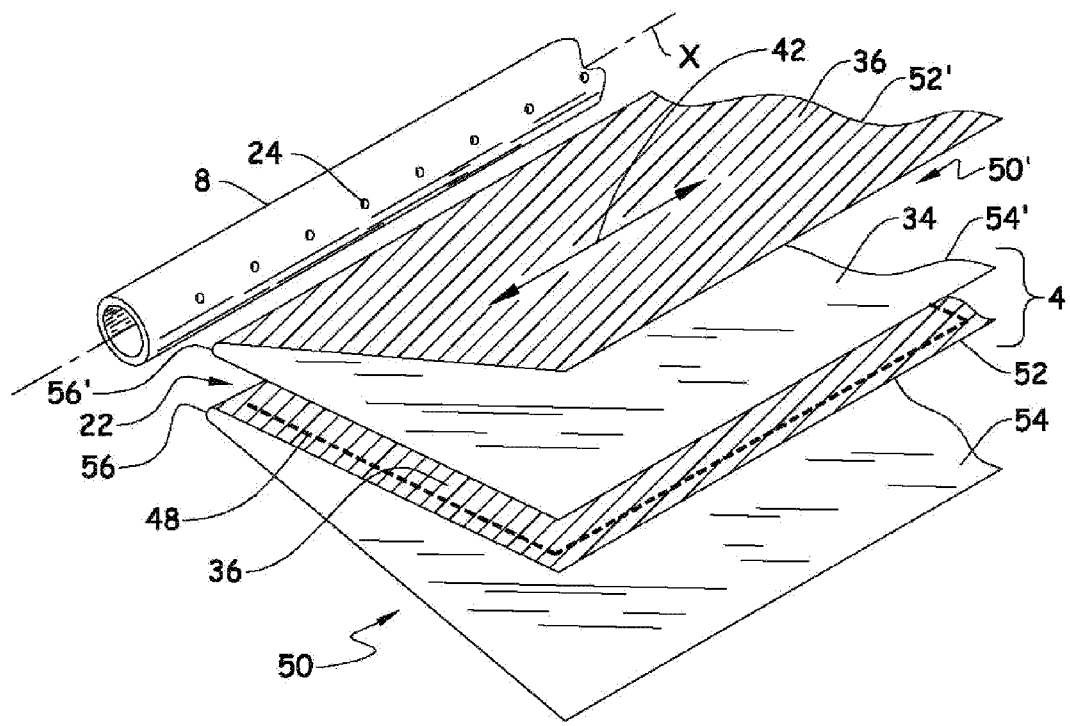
FIG. 5B is a perspective view (partially cut-away) of a partially assembled spiral wound module including a membrane envelope being assembled with two membrane leaf packets.

As shown in FIG. 5B, a membrane envelope (4) may be formed by overlaying a first membrane leaf packet (50') upon a second membrane leaf packet (50) such that the support side (not shown) of a membrane leaf (54') of the first membrane leaf packet (50') faces the support side (36) of a membrane leaf (52) of the second membrane leaf packet (50). The edges of the first and second membrane leaf packets (50, 50') are aligned such that the folds (56, 56') of each are aligned and parallel with each other. The facing membrane leaves (54', 52) are sealed together along three peripherally edges (48) such that an unsealed fourth edge defines a proximal edge (22) which is aligned and parallel to the folds (56, 56') of the first and second membrane leaf packets (50, 50'). As with the embodiments of FIG. 1 and FIGS. 4C-4D, the proximal edge (22) of the membrane envelope (22) is in fluid communication with the permeate collection tube via openings (24).

Figure 6A:
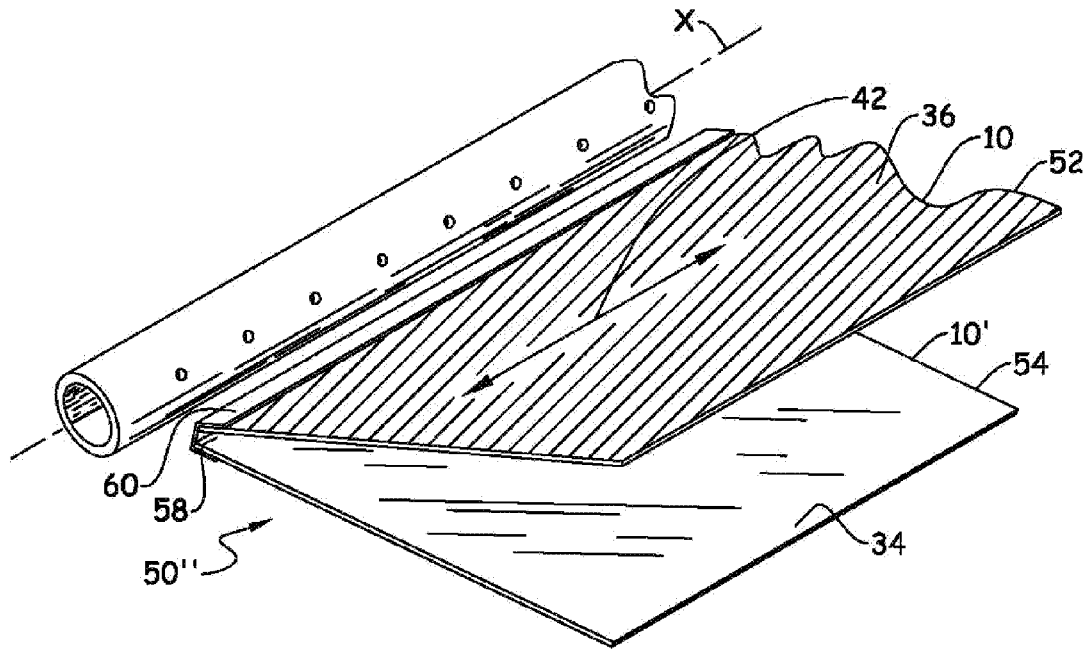
FIG. 6A is a perspective view (partially cut-away) of a partially assembled spiral wound module including an alternative embodiment of a membrane leaf packet.
Figure 6B:
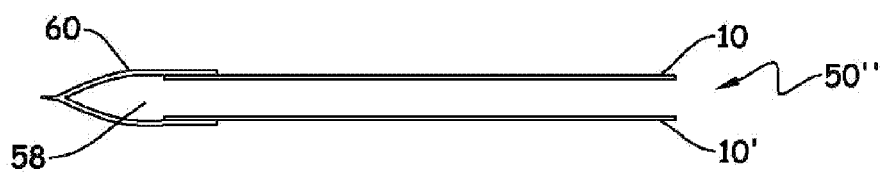
FIG. 6B is an elevation view of an alternative embodiment of a membrane leaf packet.
Figure 6C:
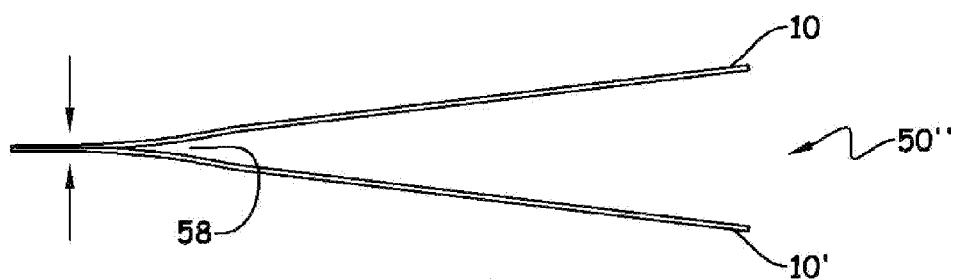
FIG. 6C is an elevation view of yet another embodiment of a membrane leaf packet.

FIG. 6A illustrates an alternative embodiment of a membrane leaf packet (50") comprising a first and second rectangular section (10, 10') of membrane sheet. The sections (10, 10') are removed from at least one roll (not shown). Each section (10, 10') has four edges and two opposing sides including a membrane side (34) and a support side (36). The membrane leaf packet (50") is formed by overlaying the first section (10) upon the second (10') such that the roll direction (42) of both sections (10, 10') are parallel to each other and the membrane side (34) of both sections (10, 10') are facing each other. The edges of the sections (10, 10') are aligned and both sections are sealed together along an aligned edge (58) which is parallel to the roll direction (42) of both sections (10, 10'), hereinafter referred to as a "sealed edge" (58). The means for sealing the sealed edge (58) are not limited. For example, in the embodiments of FIGS. 6A and 6B, tape (60) is disposed along the length of the sealed edge (58); whereas FIG. 6C illustrates an embodiment wherein heat and pressure (depicted by inward facing arrows) are applied to seal the sections (10, 10') together to form the sealed edge (58). While not shown, sealants such as adhesives may also be used to form the sealed edge (58). Membrane envelopes can be formed using the membrane leaf packets (50") of FIG. 6A in the same manner as described in connection with FIG. 5B.

Figure 7:
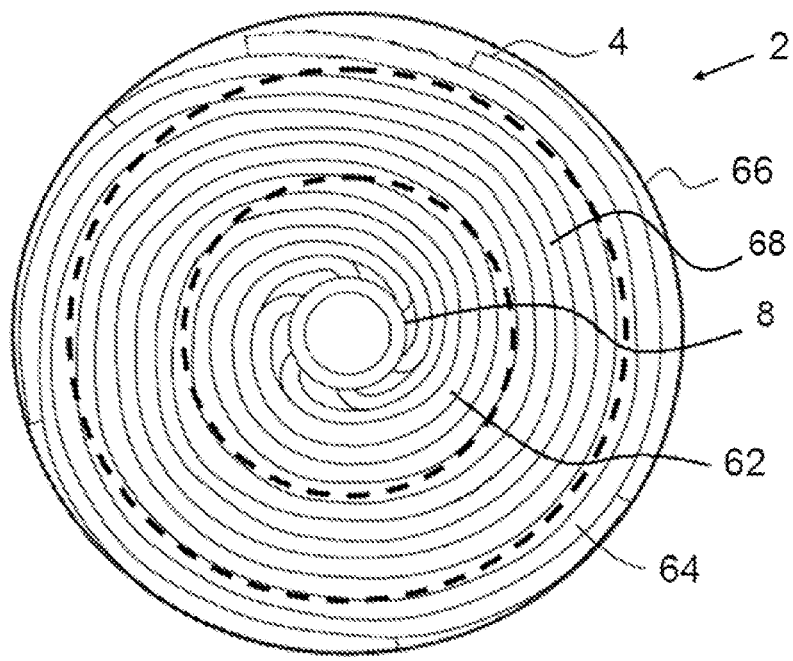
FIG. 7 is an end view of a partially assembled spiral wound module showing six membrane envelopes wound about a permeate collection tube.

As shown in FIG. 7, the spiral wound module (2) may include a plurality of membrane envelops (4). While six membrane envelopes are shown, preferred embodiments include at least 3, and in some embodiments at least 20 or even 50. The spiral would module (2) comprises an inner domain (62) (represented by the area within an inner concentric circle shown with dashed lines) that comprises 25% of the total membrane area of the module and is located closest (i.e. concentrically about) the permeate collection tube (8). The module (2) further comprises an outer domain (64) (represented by the area outside the outer concentric circle shown with dashed lines) that comprises 25% of the total membrane area of the module and is located most distal about the permeate collection tube (8). The remaining 50% of total membrane area is located within a middle domain (68). The average water permeability (or average solute permeability) of membrane located within the outer domain (64) of the module is preferable at least 10%, 25% or even 40% greater than the average water permeability (or solute permeability) of the membrane sheet in the module's inner domain (62).

Figure 8:
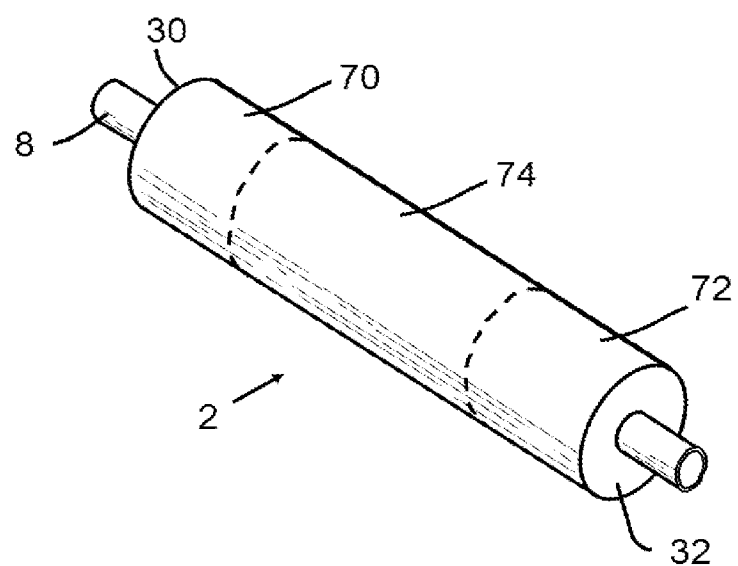
FIG. 8 is a perspective view of a spiral wound module.

FIG. 8 illustrates another embodiment of the invention wherein the spiral would module (2) comprises an inlet and outlet domain (70, 72) that each comprise 25% of the total membrane area of the module and are located adjacent to the first and second scroll faces (30, 32), with the remaining 50% of membrane area constituting a center domain (74). The average water permeability (or average solute permeability) of membrane located within the inlet domain (70) is preferably at least 10%, 25% or even 40% greater than the average water permeability (or average solute permeability) of membrane in the module's outlet domain (72).

Embodiments may include a combination of features described in connection with the embodiments of FIGS. 7 and 8. For instance, the outer domain may have an average water permeability that exceeds the inner domain by 10%, 25%, or even 40%, while membrane in the outlet domain of the module is at least 25% or even 40% greater than membrane in the inlet domain of the module.

As shown in FIG. 1, spiral wound modules of the present invention may optionally include one or more feed channel spacer sheets (6). During the fabrication of a spiral wound module, a feed channel spacer sheet may be positioned in planer alignment (i.e. overlaid) with a membrane envelope prior to winding the membrane envelope about the permeate collection tube. A spiral wound module with inlet and outlet domains that differ substantially in average water and/or solute permeabilities is particularly advantageous when using a feed spacer that is characterized as having a pressure drop greater than 1.5 bar when 0.12 m/sec water at 25° C. is flowed therethrough.

As also shown in FIG. 1, spiral wound modules of the present invention may optionally include one or more permeate channel spacer sheets (12). A permeate channel spacer sheet may be positioned within the membrane envelope such that the permeate sheet extends from the proximal edge of the membrane envelope prior to winding the envelope about the permeate collection tube. A spiral wound module with inner and outer domains that differ substantially in water and/or solute permeabilities is particularly advantageous when the permeate channel spacer has relatively high resistance to flow in the direction perpendicular to permeate collection tube. In one preferred geometry, the coefficient of pressure drop "$C_p$" in the permeate spacer sheet (in the direction perpendicular to the permeate collection tube) is chosen for the module based on the equation below:

$$C_p \equiv \frac{1}{Q_p(x)} \frac{dP(x)}{dx} > \frac{K}{A_{avg} W^2} \qquad \text{(Formula IV)}$$

wherein:

"W" is the width of the membrane sheet (i.e. from the permeate collection tube to the distal end of the membrane envelope, "P" is the pressure at location "x" located along the width (W) of the membrane sheet, "$A_{avg}$" is the average water permeability of the membrane sheet within the module, "$Q_p$" is the permeate flow rate per unit width, and "K" is a numerical value greater than 0.6, more preferably greater than 0.75 and in some embodiments greater than 0.9.

While $C_p$ is approximately a constant of the permeate spacer sheet, for purposes of the present description, $C_p$ may be determined using a flow rate $Q_p$ within the permeate spacer sheet that is an average for a spiral wound module when operating at an average flux of 1 L/m²/day with pure water at a pH of 7 and 25° C.

While not shown, feed channel spacer sheets and permeate channel spacer sheets may be provided from rolls in a manner similar to that of the membrane sheet, as shown in FIGS. 3A and 3B. The use of aligned rolls of sheet materials facilitates the production of long modules, (e.g. longer than 1 meter and preferably at least 1.75 meters, 2.75 meters, 3.75 meters, 4.75 meters and even 5.75 meters long). The use of sheet materials having higher elastic modulus values in the length or roll direction as compared with the width direction (e.g. preferably 3× greater) further facilitates the production of such long modules due to increased dimensional strength along the modules' length. The spiral module may also include glass fiber or a tape on the circumference of the module that aligns with the permeate tube (as described in U.S. 61/255,121), and this can provide strength to modules, especially modules of at least at least 1.75 meters, 2.75 meters, 3.75 meters, 4.75 meters and even 5.75 meters long.

Many embodiments of the invention have been described and in some instances certain embodiments, selections, ranges, constituents, or other features have been characterized as being "preferred". Such designations of "preferred" features should in no way be interpreted as an essential or critical aspect of the invention. While membrane sheets including thin film polyamide layers have been described in detail, other types of hyperfiltration membrane layers may be used.

The entire content of each of the aforementioned patents and patent applications are incorporated herein by reference.

What is claimed is:

1. A spiral wound module comprising:
   a permeate collection tube,
   at least one membrane envelope wound about collection tube and defining a first and second scroll face,
   wherein the membrane envelope comprises a section of membrane sheet having an active membrane area, a length corresponding to the distance between the first and second scroll faces, a width extending in a direction perpendicular to the length, at least one longitudinal axis extending along the length of the sheet and dividing the sheet into an inner and outer region with the inner region located adjacent to the permeate collection tube, and at least one latitudinal axis extending along the width of the sheet and dividing the sheet into an inlet and outlet region with the inlet region located adjacent to the first scroll face,
   wherein the membrane sheet comprises a semi-permeable membrane layer and a support layer, and
   wherein in the spiral wound module is characterized by the membrane sheets being prepared such that the active membrane area of the membrane sheet has an average water permeability or average solute permeability that varies by at least 10% between at least one of: i) the inner and outer regions and ii) the inlet and outlet regions.

2. The spiral wound module of claim 1 further characterized by the membrane sheet having an average water permeability that varies by at least 25% between at least one of:
   i) the inner and outer regions and ii) the inlet and outlet regions.

3. The spiral wound module of claim 1 further characterized by the membrane sheet having an average water permeability that varies by at least 40% between at least one of:
   i) the inner and outer regions the inlet and outlet regions.

4. The spiral wound module of claim 1 wherein the average water permeability of the outer region of the membrane sheet is at least 25% greater than the average water permeability of the inner region.

5. The spiral wound module of claim 1 wherein the average water permeability of the outlet region of the membrane sheet is at least 25% greater than the average water permeability of the inlet region.

6. The spiral wound module of claim 1 wherein the section of membrane sheet has an area, wherein the inner and outer regions each comprises 25% of said area and wherein the outer region has an average water permeability at least 10% greater than the average water permeability of the inner region.

7. The spiral wound module of claim 1 wherein the section of membrane sheet has an area, wherein the inlet and outlet regions each comprises 25% of said area and wherein the outlet region has an average water permeability at least 25% greater than the average water permeability of the inlet region.

8. A method for making a spiral wound module comprising:
   providing a permeate collection tube;
   providing at least one roll of membrane sheet,
      wherein the membrane sheet comprises: a semi-permeable membrane layer and support layer which are rolled up in a roll direction;
   removing a first and second rectangular section of membrane sheet from at least one roll, wherein each section includes: four edges, two opposing sides including a membrane side and a support side, a length in the roll direction, a width extending in a direction perpendicular to the length, at least one longitudinal axis extending along the length of the section and dividing the membrane sheet into an inner and outer region, and at least one latitudinal axis extending along the width and dividing the membrane sheet into an inlet and outlet region, wherein each section has an average water permeability that varies by at least 10% between at least one of: i) the inner and outer regions and ii) the inlet and outlet regions;
   forming a membrane envelope by:
      overlaying the first section of membrane sheet upon the second section so that: the roll direction of both sections are parallel to each other, and
         the inner, outer, inlet and outlet regions of each section of membrane sheet are directly opposed to each other;
      aligning the edges of both sections of membrane sheet with each other;
      sealing both sections of membrane sheet together along three of the aligned edges such that an unsealed fourth edge is parallel to the roll direction of both sections and defines a proximal edge; and
      winding the membrane envelope concentrically about the permeate collection tube such that the proximal edge of the membrane envelope is in a proximal position along the permeate collection tube.

9. The method of claim 8 further characterized by each section of membrane sheet having an average water permeability that varies by at least 25% between at least one of:
   i) the inner and outer regions and ii) the inlet and outlet regions.

10. The method of claim 8 wherein the average water permeability of the outer region of each section of membrane sheet is at least 25% greater than the average water permeability of the inner region.

11. The method of claim 8 wherein the average water permeability of the outlet region of each section of membrane sheet is at least 25% greater than the average water permeability of the inlet region.

12. The method of claim 8 wherein the semi-permeable membrane layer comprises a hyperfiltration membrane.

13. The method of claim 8 wherein each section of membrane sheet has an elastic modulus, and wherein the elastic modulus in the roll direction is at least 1.5 times greater than the elastic modulus in a direction perpendicular to the roll direction.

14. The method of claim 8 wherein the permeate collection tube has a length, the roll of membrane sheet has a width, and wherein the step of removing rectangular sections of membrane sheet from the roll comprises:

unrolling and detaching rectangular sections of membrane sheet from at least one roll, wherein each section has length extending in the roll direction which corresponds to the length of the permeate collection tube and a width which corresponds to the width of the roll; and wherein the length of the section of membrane sheet is at least twice as large as the width.

15. The method of claim 8 wherein the wherein the spiral wound module is at least 1.75 meters long.

* * * * *